US007107372B2

(12) United States Patent
Van De Meulenhof et al.

(10) Patent No.: US 7,107,372 B2
(45) Date of Patent: Sep. 12, 2006

(54) COMMUNICATION SYSTEM AND DEVICE

(75) Inventors: Dennis Van De Meulenhof, Eindhoven (NL); Antonio Elias Salloum Salazar, Eindhoven (NL)

(73) Assignee: Koninklijke Philips Electronics, Eindhoven (NL)

( * ) Notice: Subject to any disclaimer, the term of this patent is extended or adjusted under 35 U.S.C. 154(b) by 471 days.

(21) Appl. No.: 09/933,846

(22) Filed: Aug. 21, 2001

(65) Prior Publication Data

US 2002/0083245 A1 Jun. 27, 2002

(30) Foreign Application Priority Data

Aug. 23, 2000 (EP) .................................. 00202949

(51) Int. Cl.
*G06F 13/42* (2006.01)
(52) U.S. Cl. ...................................... 710/105; 710/305
(58) Field of Classification Search .................. 710/33, 710/104, 105, 106, 107, 110; 370/254, 257, 370/400, 437, 439, 443, 468; 709/227, 228, 709/231; 725/95
See application file for complete search history.

(56) References Cited

U.S. PATENT DOCUMENTS

| | | | | |
|---|---|---|---|---|
| 5,535,208 A | * | 7/1996 | Kawakami et al. | 370/391 |
| 5,550,802 A | * | 8/1996 | Worsley et al. | 370/252 |
| 5,835,498 A | | 11/1998 | Kim et al. | |
| 5,963,202 A | | 10/1999 | Polish | |
| 6,160,796 A | * | 12/2000 | Zou | 370/257 |
| 6,272,546 B1 | * | 8/2001 | Ludtke | 709/231 |
| 6,452,935 B1 | * | 9/2002 | Gibbs | 370/439 |
| 6,591,313 B1 | * | 7/2003 | Hata et al. | 710/33 |
| 6,678,769 B1 | * | 1/2004 | Hatae et al. | 710/105 |
| 6,820,150 B1 | * | 11/2004 | Joy et al. | 710/110 |

OTHER PUBLICATIONS

IEEE 1394 Serial Bus Controller, Fujitsu, 11 1996.*
Fire on the Wire, Roger Jennings, 1995-1998.*
IEEE 1395, Jaycar Electronics Reference Data Sheet, Copyright @ Jaycard Electronics, 2002.*
1394 Isochronous Transfers, Part 1, Bill McKenzie, Sep. 2003.*
Dennis van de Meulenhof et al., "Communication System, Controlling Devices and Controlled Device", Filed Mar. 30, 2001, Serial No. 09/822,392.

* cited by examiner

*Primary Examiner*—Khanh Dang

(57) ABSTRACT

A communication system (500) comprising a plurality of devices (101–106) interconnected via a bus, the bus being capable of handling isochronous and asynchronous transmissions. A status manager (105) maintains an isochronous status channel for broadcasting status information on the isochronous status channel. Devices (101–106) can send status information to the status manager (105) so it can broadcast it over the status channel. The devices (101–106) can then tap into the status channel to read the status information if they support it, or use conventional asynchronous messages to obtain the status information otherwise. Information on the status channel is only sent once, which saves bandwidth. This information can be about the network topology of the communication system (500), about capabilities of a device (101–106) in the communication system (500), about available bandwidth on the bus, or about the strength of a level of attachment between a mobile device (520) and a base station device (106) in the communication system (500).

22 Claims, 3 Drawing Sheets

COMMUNICATION SYSTEM AND DEVICE

The invention relates to a communication system comprising a plurality of devices interconnected via a bus, the bus being capable of handling isochronous and asynchronous transmissions.

The invention further relates to a device for use in such a communication system.

A communication system according to the preamble is known from IEEE Computer Society, "IEEE Standard for a High Performance Serial Bus", Institute of Electrical and Electronic Engineers Inc., IEEE standard 1394–1995.

Devices from the consumer electronics (CE) industry and from the personal computer (PC) industry are more and more connected together into home networks. Such home networks are typically capable of transporting both isochronous (real-time) and asynchronous (non real-time) information. Usually, content such as audio and video streams is transmitted isochronously, and control information is typically transmitted asynchronously. The IEEE 1394 specification and its 1394a and 1394a-2000 extensions provide a standard for the bus in such a home network.

Devices on an IEEE 1394 bus are all peer nodes, arranged in a topology such as a star, tree, daisy chain, or a combination thereof, although the topology should not contain loops. It is possible to add and remove devices from the bus while the system is operating. Although one device operates as Cycle Manager and others may optionally operate as a Bus Manager or Isochronous Resource Manager, no device is required to assume a role of overall master controller for the bus. All operations are performed in a distributed peer-to-peer manner. This architecture lends itself well to audio and video systems, since such devices are traditionally connected in a peer-to-peer fashion.

The devices in the home network at least support asynchronous communication. Most devices also support isochronous communication, as they are intended for use with audio and/or video streams, which should be transmitted in real time. A portion of the bandwidth on the network bus is reserved for asynchronous transmissions. At regular intervals, the so-called fairness intervals, devices can initiate asynchronous transmissions on the bus. This prevents isochronous transmissions, which typically require a large amount of bandwidth, from occupying all the bandwidth on the bus and thereby preventing control information and the like of being sent.

For isochronous transmissions, IEEE 1394 supports up to 63 independent isochronous "channels," each of which may contain an unlimited number of logical audio or video channels, limited by the available bandwidth. In a multimedia system, for example, one isochronous channel could carry a surround sound audio signal and an uncompressed digital video signal. To transmit information isochronously, a device contacts the Isochronous Resource Manager and requests a channel and a certain amount of bandwidth. The Isochronous Resource Manager determines if this is possible, and if so, allocates the channel so the device can use it. When the device has finished transmitting, the Isochronous Resource Manager deallocates the channel so that the bandwidth reserved for it becomes available again.

IEEE 1394 isochronous transmissions are broadcast on to the bus with a channel identifier, in a connectionless fashion. Any isochronous-capable device can read from any isochronous channel, and if it knows in advance which streams are transmitted over which isochronous channels, it is straightforward to dynamically tune in to any desired stream on the bus.

Status information, such as the available bandwidth on the bus, the capabilities of a resource or a map of the network topology, is usually stored on one device. Other devices that need this information contact this device directly using asynchronous messages, and the answer is provided to them in the same fashion. Thus, if many devices need the same status information, many asynchronous messages are sent. The responses sent by the device having the status information are all the same, yet multiple messages are necessary because they must be sent to different devices. This is a waste of bandwidth. Further, a device which uses its fairness interval to transmit these wasteful asynchronous messages can no longer use it for more urgent or important purposes.

It is an object of the invention to provide a communication system according to the preamble, which uses the available bandwidth more efficiently and reduces the sending of unnecessary messages.

This object is achieved in a communication system which is characterized in that the communication system comprises a status manager having status channel creation means for creating on the bus an isochronous status channel and having status transmitting means for transmitting status information on the isochronous status channel. The isochronous status channel can be received by any device on the bus, and so is an efficient way of transmitting information to those devices. Since the information is only sent once, no unnecessary duplicates of status information messages are sent. A device wishing access to status information can tap into the status channel and read the information from there.

The status manager is responsible for creating the status channel and transmitting information on it. This information can be obtained from other devices, for example by asynchronous transmissions from those devices to the status manager, or from a source which the status manager can access itself. For example, if the Bus Manager is the status manager, it has direct access to the topology map, and can transmit this information at any time. The Isochronous Resource Manager has direct access to bandwidth- and channel-related information and can transmit this status information on the status channel whenever it changes, so all devices know when the available bandwidth has changed, when channels are allocated or deallocated, and so on.

The status manager can allocate the channel at the Isochronous Resource Manager at any time, for example when another device contacts it with status information to be transmitted over the status channel. This is a good indication that a status channel is needed. By allocating the status channel only when necessary, the status manager prevents wasting one of the available isochronous channels which could have been used for other transmissions. Further, using the status channel, devices avoid having to send asynchronous messages to learn the information which is broadcasted on the status channel, and so can use now send other asynchronous messages instead. In a heavily loaded network, this makes transmissions faster.

Devices which, for one reason or another, cannot read status information from the status channel, can still use the old mechanism to obtain the status information. Thus, the solution is compatible with such devices.

In an embodiment the status manager further has status reception means for receiving status information from a device from said plurality asynchronously, coupled to the status transmitting means for transmitting the received status information on the isochronous status channel. An advantage of this embodiment is that the status manager now serves as a central distribution point for the other devices on the bus, so that these devices need only send their status information once, to the status manager, rather than multiple times to multiple devices.

If no status channel is presently allocated, the status manager could use the event of receiving status information from a device to determine that a status channel should be created. It then contacts the Isochronous Resource Manager to have an isochronous status channel allocated.

In a further embodiment the status manager is further arranged to send to the device an identifier for the isochronous status channel in response to receiving the status information. An advantage of this embodiment is that the device is automatically informed on which channel it should listen to obtain status information.

In a further embodiment a device from said plurality has status reading means for reading the transmitted status information from the isochronous status channel. Receiving status information involves tapping into the status channel reading data from the status channel and decoding and processing this data to obtain the status information. The devices need to know the channel identifier of the status channel first. To learn this identifier, they could send an asynchronous message to the status manager from the previous embodiment and obtain a response with this identifier. Alternatively, they could simply scan all allocated channels to see if any status information can be found in any of them. The status channel could also have a predetermined reserved channel identifier.

In a further embodiment a device from said plurality has status sending means for sending status information to the status manager asynchronously. An advantage of this embodiment is that this allows the device to efficiently distribute the status information to other devices on the bus. It only needs one transmission to the status manager, rather than multiple transmissions to multiple other devices.

In a further embodiment the status information comprises information on the network topology of the communication system. An advantage of this embodiment is that devices can now automatically be informed of changes in this topology, and no longer need to contact the Bus Manager whenever they need this information.

In a further embodiment the status information comprises information on capabilities of a device in the communication system. An advantage of this embodiment is that a device can now announce its capabilities to other devices, rather than having to respond to individual requests for information on its capabilities coming from multiple devices.

In a further embodiment the status information comprises information on available bandwidth on the bus. Ordinarily, a device which wishes to obtain an isochronous channel must first send an asynchronous message to the Isochronous Resource Manager to obtain the available bandwidth, and then send a second message to request a channel and a certain amount of bandwidth, computed from the information embedded in the first response. Broadcasting the available bandwidth on the status channel has the advantage that devices can obtain the information from there and determine if there is sufficient bandwidth to satisfy its requirements. This saves these devices from having to send a query to the Isochronous Resource Manager, which makes the procedure of obtaining isochronous channels more efficient.

In a further embodiment the status information comprises information on a strength of a level of attachment between a mobile device and a base station device in the communication system. An advantage of this embodiment is that this information can now be shared efficiently with other devices which are capable of functioning as base station for the mobile device. It allows them to stay in contact with each other without having to send many asynchronous messages to each other, and enables them to determine which base station is best suited to transfer control over the mobile device to.

It is a further object to provide a device for use in the communication system according to the invention, which is characterized by status channel creation means for creating on the bus an isochronous status channel and status transmitting means for transmitting status information on the isochronous status channel.

It is a further object to provide a device for use in the communication system according to the invention, which is characterized by status reading means for reading the transmitted status information from the isochronous status channel.

These and other aspects of the invention will be apparent from and elucidated with reference to the embodiments shown in the drawing, in which:

FIG. 1 schematically shows a first communication system comprising a number of devices interconnected via a bus;

FIG. 2 schematically shows a portion of a data transmission;

Figure 5:
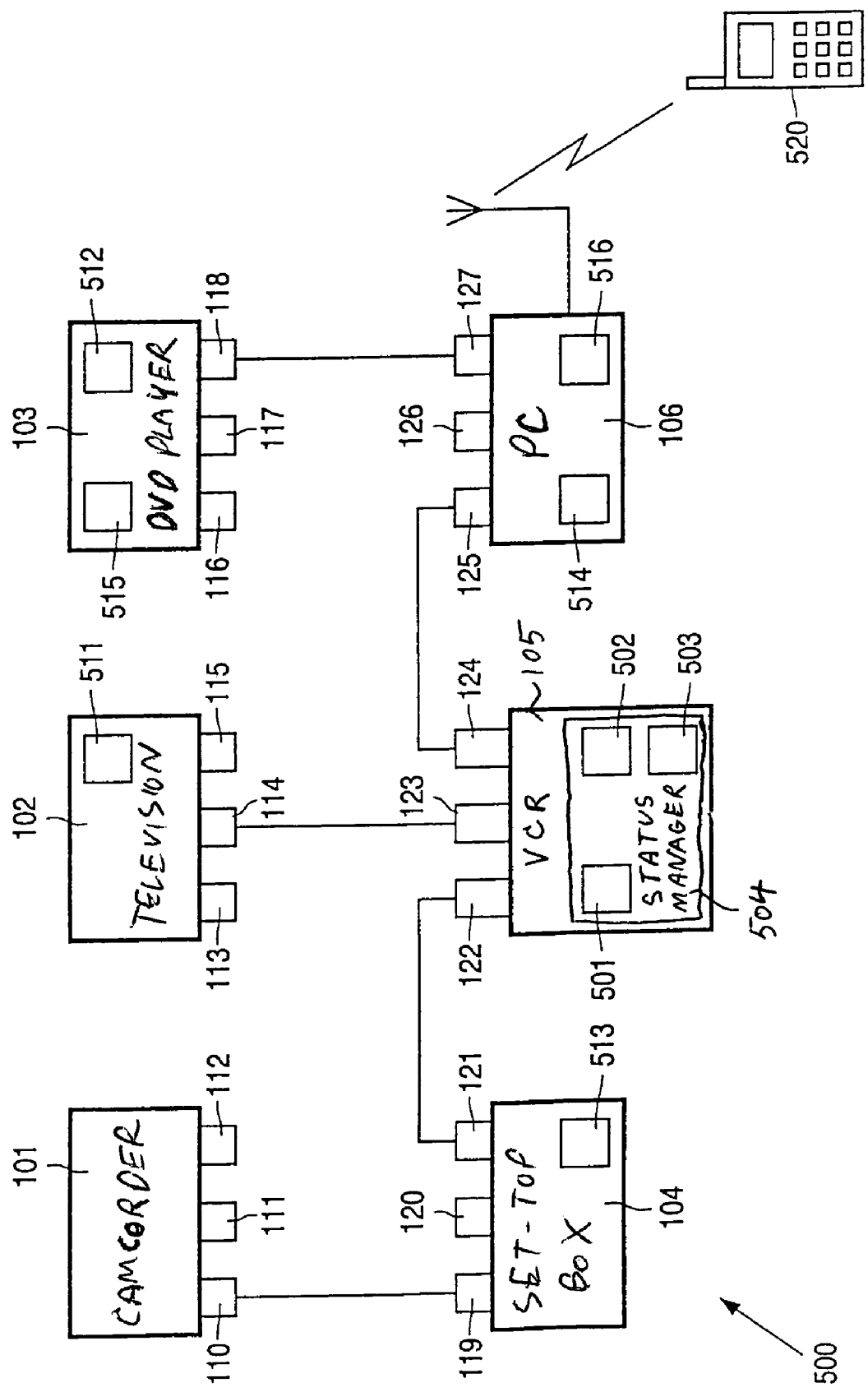

FIG. 5 schematically shows a second communication system comprising a number of devices interconnected via a bus.

Throughout the figures, same reference numerals indicate similar or corresponding features. Some of the features indicated in the drawings are typically implemented in software, and as such represent software entities, such as software modules or objects.

Figure 1:
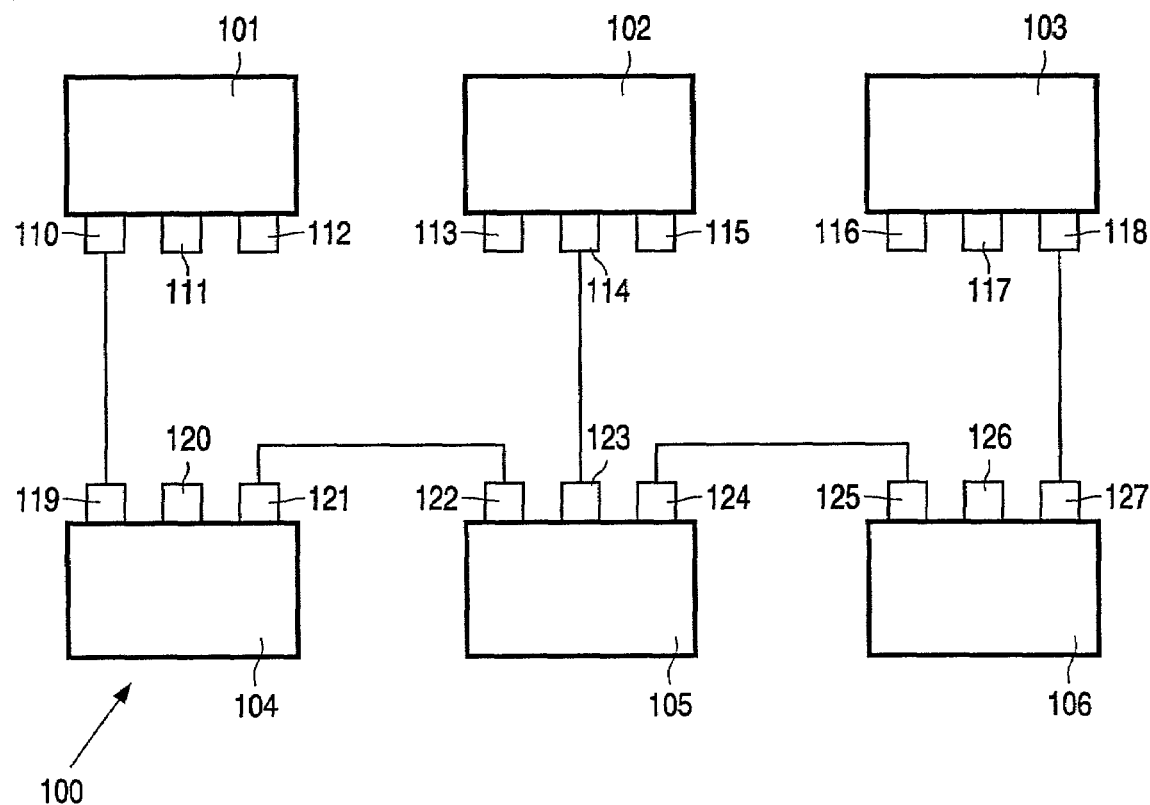

FIG. 1 schematically shows a communication system 100 comprising, by way of example, a camcorder 101, a television 102, a DVD player 103, a set-top box 104, a VCR 105 and a personal computer 106. The devices 101–106 are interconnected via an IEEE 1394 bus, although an IEEE 1394a or similar bus could also be used. The bus operates in a distributed peer-to-peer manner, with a point-to-point signaling environment. The devices 101–106 on the bus have one or more ports 110–127 on them, which can act as a repeater, retransmitting any packets received by other ports on the device. The camcorder 101 and the set-top box 104 are interconnected through respective ports 110 and 119. The set-top box 104 and the VCR 105 are interconnected through respective ports 121 and 122, and so on. The IEEE 1394 standard specifies that two devices should not have more than 16 cable hops between them. One bus may connect up to 63 devices, and up to 1023 buses can be interconnected. This way, a very large network with at most 64,449 devices can be created. Each node may have up to 256 terabytes of memory addressable over the bus.

As the bus operates in a peer-to-peer fashion, no central bus controller is required. However, there usually are one or more devices which perform a special function. These devices are the Cycle Manager, the Bus Manager and the Isochronous Resource Manager.

The Cycle Manager maintains the common clock reference for the devices 101–106 on the network. It transmits a Cycle Start packet every 125 μs. This packet contains the value of the Cycle Manager's local clock, and this value is used by the receiving devices to synchronize their local clocks. There is always a device on the bus which acts as Cycle Manager.

The Bus Manager performs bus optimizations such as power management, and maintains information such as a map of the topology of the network and a list of the speed of the devices 101–106 on the bus. This information can be used by devices to select optimal communication speeds and routes.

The Isochronous Resource Manager manages the allocation and deallocation of isochronous channels. A device 101–106 that wants to transmit data over an isochronous channel must contact the Isochronous Resource Manager with a request for a channel and a certain amount of bandwidth. The Isochronous Resource Manager will then allocate a channel number (0 to 63) and a certain amount bandwidth for the device 101–106. If no bandwidth or channel can be allocated, the device 101–106 is expected to repeat its request at a later time. When the device 101–106 has completed its isochronous data transmission, it contacts the Isochronous Resource Manager again so it can deallocate the channel. When the bus is reset, devices 101–106 that were using an isochronous channel can re-request it, so they can continue their transmission on that channel.

It is possible to add and remove devices 101–106 from the bus while the system 100 is operating. If a device 101–106 is added to the bus, a bus reset occurs automatically. A reset can also be initiated via software. After a reset, the devices 101–106 configure themselves, starting with the leaf nodes and then with the branch nodes. Configuration consists of bus reset, tree identification, and self identification.

When a device 101–106 receives a reset signal, it passes this signal on to all other devices to which it is connected. The device 101–106 then remains idle for some time to allow the reset signal to propagate to all devices on the bus. The reset signal also erases information on the bus topology present on the device.

Next, tree identification is performed, which defines the network topology as a tree of devices with a root node to which other nodes are connected. A node is called a parent node to another node if it is connected to that other node and closer to the root node than that other node. The other node is then called the child node to the parent node. Note that this is a logical topology, which may be different from the physical topology of the network.

The topology of the network is determined as follows. The leaf nodes, in FIG. 1 being the devices 101, 102, 103, present on their respective ports 110, 114, 118 a parent notification signal. The respective branch nodes, in FIG. 1 being the devices 104, 105, 106, see this parent notification signal on their respective ports 119, 123, 127, present a child notification signal to these ports 119, 123, 127 and mark them as being connected to a child node. The leaf nodes 101, 102, 103 will then remove their parent notification signals from their respective ports 110, 114, 118.

The set-top box 104 and personal computer 106 then present a parent notification signal on their respective ports 121 and 125, which are not marked as being connected to a child node. The VCR 105 receives these parent notification signals on its unmarked ports 122, 124, presents a child notification signal to these ports 122, 124 and marks them as being connected to a child node. Since the VCR 105 now has marked all of its port as being connected to child nodes, the VCR 105 becomes the root node.

It is possible that a conflict arises in this process on which device should become the root node, for example when all branch nodes have an equal number of unmarked ports and then present parent notification signals at the same time. To prevent this, a random back-off timer can be used to allow one device to become the root node. A device can also force itself to become the root node by delaying its responses in the signaling process. For example, if the personal computer 106 had delayed its parent notification signal, the VCR 105 would eventually have presented a parent notification signal on its port 124. The personal computer 106 would then have presented a child notification signal on its port 125 and would then have marked all its pots as being connected to child nodes, so it would then have become the root node.

After the logical tree topology has been defined, the devices 101–106 perform a self identification. This comprises assigning physical IDs to each device 101–106 exchanging transmission speed capabilities between neighbors, and distributing the tree topology to all devices 101–106. Self identification begins when the root node, the VCR 105, sends a signal to the lowest numbered port 122 to which a device is connected. The set-top box 104 receives it and propagates it to its lowest numbered port 119. The camcorder 101 receives the signal on port 110, but cannot propagate it any further. It then assigns itself physical ID 0 and transmits a self ID packet back to the set-top box 104. The self ID packet at least contains the physical ID of the device which created it, and may also contain other information, such as the transmission speed capabilities of this device. The set-top box 104 retransmits this self ID packet to all its ports 119–121 with devices attached to it. Eventually the self ID packet arrives at the root node, which proceeds to transmit the self ID packet down to all devices on its higher-numbered ports 123, 124. This way all attached devices receive the self ID packet from the camcorder 101. Upon receiving this packet, all of the other devices 102–106 increment their self ID counter, which initially is zero for all devices. The camcorder 101 then signals a self ID done indication to the set-top box 104, because it has completed the self ID process. Since the set-top box 104 has not completed its own self ID process, it does not retransmit this indication to the root node.

The root node now sends another signal to the lowest numbered port from which no self ID done indication was received, which is port 122. The set-top box 104 has no further attached devices without an assigned physical ID, so it assigns itself physical ID 1 and transmits this packet to the other devices 101, 102, 103, 105, 106 in the manner described in the previous paragraph. The set-top box 104 then transmits a self ID done notification to the root node, after which the root node repeats the process with port 123, since this is now the lowest numbered port from which no self ID done indication was received. After the device 104 has been assigned a physical ID, the process is repeated for port 124 and devices 103 and 106 as well. Using this self identification process, all devices 101–106 will assign themselves a unique physical ID, and the root node will always have the highest physical ID. When the process has been completed, the camcorder 101 will have physical ID 0, the set-top box 104 will have physical ID 1, the television 102 will have physical ID 2, the DVD player 103 will have physical ID 3, the personal computer 106 will have physical ID 4, and the VCR 105 will have physical ID 5.

Before initialization is completed, one or more devices must be assigned the roles of Cycle Manager, and also a Bus Manager and Isochronous Resource Manager may be elected. The root node must be the Cycle Manager. If the bus is reset and a device which cannot operate as a Cycle Manager becomes the root node, the bus is reset again and a device which can operate as a Cycle Manager will become the root node. The Bus Manager is responsible for determining if the device that has become the root node can operate as a Cycle Manager. If it determines that this is not the case, the Bus Manager forces a reset so that another device, which can operate as a Cycle Manager, is chosen as the root node. The Bus Manager is elected by the devices.

Devices can indicate in their self ID packet that they wish to become the Isochronous Resource Manager. When the self identification process is completed, the one with the highest physical ID is elected from these devices as the Isochronous Resource Manager.

Figure 2:
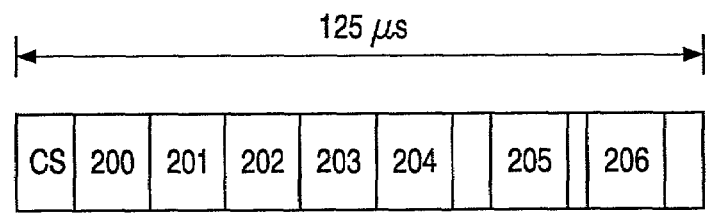

FIG. 2 schematically shows a portion of a data transmission. IEEE 1394 offers two transmission modes. Asynchronous transmission is a non real-time mode with acknowledgments for each transmitted packet, allowing for guaranteed delivery. It is mainly useful for transmitting data such as control data, where timing is not of critical importance. Access to the bus for transmitting asynchronous data is guaranteed using a fairness interval. In each fairness interval, a device can initiate one asynchronous bus access. Normally, at least 20% of the bus bandwidth is reserved for asynchronous transfers. Using asynchronous transmissions, a device can for instance query another device for some kind of functionality, such as whether it can handle some type of data, or it can control the other device by sending commands asynchronously to it.

Isochronous transmissions are real-time, have a predictable latency and have a specified amount of bandwidth reserved for them. Typically, time-critical data such as audio and video streams are transmitted isochronously. IEEE 1394 supports up to 63 independent isochronous channels, each of which may contain an unlimited number of logical audio or video channels, limited by the available bandwidth. In a multimedia system, for example, one isochronous channel could carry a surround sound audio signal and an uncompressed digital video signal.

Isochronous transmissions take place in so-called isochronous cycles, time segments which are normally about 100 μs. A cycle begins when the Cycle Manager transmits the asynchronous Cycle Start (CS) packet over the bus. The devices 101–106 wishing to transmit data on an isochronous channel then signal a request for bus access to their parent node in the tree topology. This request is passed on to the root node. The root node then grants access to the bus to one device wishing to transmit data. This is usually the device closest to the root node, since it takes the least time for its signal to reach the root node.

As an example, assume that the camcorder 101, the television 102, the DVD player 103, the set-top box 104 and the personal computer 106 all wish to transmit data on respective isochronous channels. They all have previously obtained a channel number and a certain amount of bandwidth. The order in which they transmit their data packets depends on the time it takes for the respective requests to arrive at the root node. Assume that the request from the television 102 arrives first. It is then granted access, and transmits isochronous data packet 200. The set-top box 104 is next, and transmits isochronous data packet 201. This packet 201 is followed by isochronous data packet 202, sent by the personal computer 106. Lastly, the camcorder 101 and the DVD player 103 transmit isochronous data packets 203 and 204. The bus may be idle between transmitting the data packets 200–204.

Once a device 101–106 has used its access to transmit a data packet, it may no longer request bus access during that isochronous cycle. This gives other devices 101–106 a chance to access the bus. If one device 101–106 wants to transmit data on multiple isochronous channels, it must issue separate requests for each channel, and they will be granted separately.

After the last device 101–106 has transmitted its data on an isochronous channel, the bus becomes idle. During the idle time, devices 101–106 are allowed access to the bus to transmit asynchronous data packets 205, 206, where the order of access is determined in the same fashion as for isochronous data transmissions 200–204. To ensure all devices 101–106 an equal chance of access, this idle time is divided into fairness intervals. During a fairness interval, a device 101–106 may only transmit one asynchronous data packet 205, 206. Once all devices 101–106 that wanted access have had their opportunity, and the bus has subsequently been idle for the length of an Arbitration Reset Gap, a new fairness interval begins, and devices can transmit further asynchronous data packets.

It is possible that the transmission of asynchronous data packets takes more time than is available in a cycle. This means that the CS packet which starts the subsequent cycle will be delayed. The time available for asynchronous data transmissions in this subsequent cycle will then be lower to make up for the delay.

Figure 3:
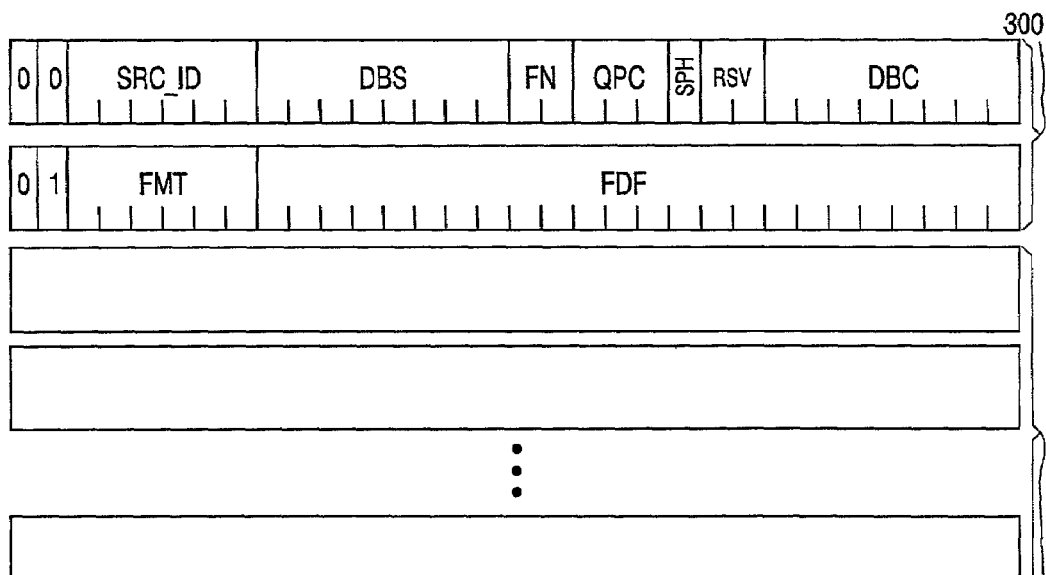
FIG. 3 shows the format of an isochronous data packet.

FIG. 3 shows the structure of an isochronous data packet. The IEEE 1394 standard specifies how isochronous data is transmitted from one device to another, but does not specify the format for specific types of data, such as audio or video data. The IEC 61883 standard for Digital Interfaces for Consumer Electronic Audio/Video Equipment is one standard which specifies the format of isochronous data packets. This format is also known as the Common Isochronous Packet (CIP) format.

Each packet consists of a 32-bits header 300, followed by a number of payload data blocks 301. The format of the payload 301 depends on the information in the header 300, and it can be virtually anything. The fields in the header 300 are defined as follows:

| Field | Name | Meaning |
| --- | --- | --- |
| SRC_ID | Source ID | ID of device which sent the packet. |
| DBS | Data Block Size | Size of data block in 32-bits quadlets. May not exceed 256 quadlets per packet. |
| FN | Fraction Number | A data block can be fragmented into 1, 2, 4 or 8 packets, with FN being 00, 01, 10, 11 respectively. |
| QPC | Quadlet Paddling Count | Used when FN does not equal 00. |
| SPH | Source Packet Header | Flags that the source packet has in its own header. |
| RSV | Reserved | |
| DBC | Data Block Count | Sequence number for the data block. When packet fragmentation is used (FN > 00), the lower bits of this field indicate the offset value of the first data block in the packet. |
| FMT | Format ID | The type of data in the data block. Values have been defined for MPEG-2, DVCR, and so on. |
| FDF | Format Dependent Field | The meaning of this field depends on the FMT field. |

The first two bits of the first header word are always "00", and the first two bits of the second header word are always "01".

Figure 4:
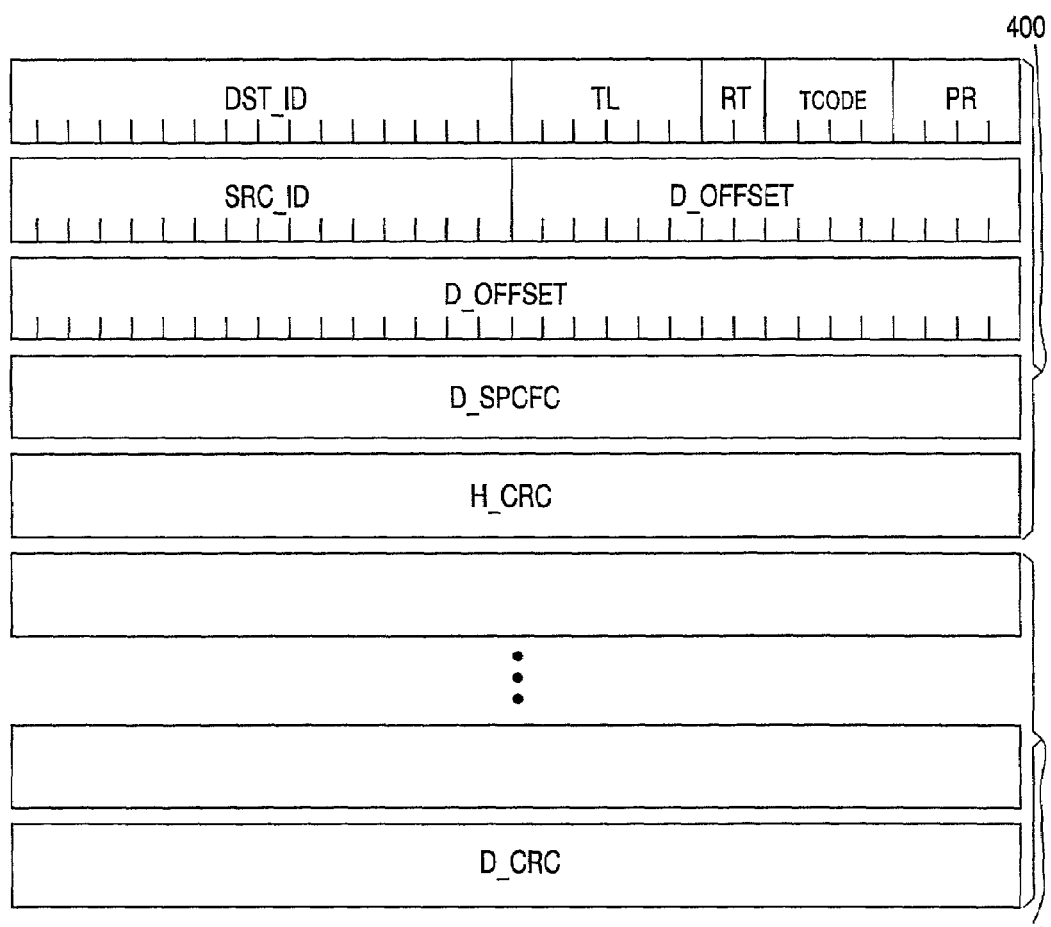
FIG. 4 shows the format of an asynchronous data packet.

FIG. 4 shows the format of an asynchronous data packet. Each packet consists of a header 400, optionally followed by a number of payload data blocks 401. The data blocks, if present, are followed by a data cyclic redundancy count block D_CRC to ensure data integrity. The fields in the header 400 are defined as follows:

| Field | Name | Meaning |
|---|---|---|
| DST_ID | Destination ID | ID of the destination device. |
| TL | Transaction Label | Label for the transaction. |
| RT | Retry Code | Indicating a retry attempt and retry protocol. |
| TC | Transaction Code | Indicating the type of transaction. |
| PR | Priority Field | Access priority. |
| SRC_ID | Source ID | ID of source device. |
| D_OFFSET | Destination Offset | Local address in destination device. |
| D_SPCFC | Data Specific | |
| H_CRC | Header CRC | To ensure header integrity. |

The Cycle Start packet CS is a special type of asynchronous packet, with no data portion 401. It is one of the Primary Asynchronous Packets. The values for the fields in the header 400 in the Cycle Start packet are defined as follows (values are in hexadecimal notation):

| Header field | Value | Note |
|---|---|---|
| DST_ID | FFFF | Indicating a broadcast address. |
| TL | 0 | |
| RT | 0 | |
| TC | 8 | Indicating a CS packet. |
| PF | FF | Highest access priority. |
| SRC_ID | ID of Cycle Manager | The Cycle Manager sends the CS packet. |
| D_OFFSET | FFFF F000 0200 | |
| D_SPCFC | Value of Cycle Time register | The Cycle Time is used to synchronize device clocks. |
| H_CRC | CRC over previous values | Computed as specified in the standard. |

FIG. 5 schematically shows a communication system 500 comprising the camcorder 101, the television 102, the DVD player 103, the set-top box 104, the VCR 105 and the personal computer 106. The devices 101–106 are interconnected via an IEEE 1394 bus, although an IEEE 1394a, 1394a-2000 or similar bus could also be used. In this communication system 500, the VCR 105 is elected as the root node using the procedure described above with reference to FIG. 1. The VCR 105 also functions as Cycle Manager and as Isochronous Resource Manager, although other devices could also act as Isochronous Resource Manager. The personal computer 106 is elected as the Bus Manager.

In accordance with the invention, the communication system 500 also comprises a Status Manager, which is responsible for distributing status information to the devices 101–106 over an isochronous status channel. One of the devices 101–106 is elected as a Status Manager. Depending on the type of status information that will be distributed, several choices are available. If the status information relates to the bus, for instance the available bandwidth or the channel allocations, then the Isochronous Resource Manager is a good choice. The Bus Manager, which maintains a network topology map, can also operate as the Status Manager if topology information is to be distributed. However, in general any device can operate as the Status Manager, assuming it has the necessary means. If more than one device is capable of operating as the Status Manager, an election mechanism similar to the mechanism of electing the Isochronous Resource Manager or the Bus Manager can be used.

In the communication system 500, the VCR 105 operates as the Status Manager. The Status Manager 504 has status channel creation module 501 for creating on the bus an isochronous status channel. The status channel creation module 501 can create the status channel for example on request, or when the Status Manager 504 is powered up or reset, or when it determines that at least one device 101–106 is capable of reading from the isochronous status channel. This determination can be made, for example, if this at least one device 101–106 contacts the Status Manager 504 with status information to be distributed on the status channel, as explained below. The Status Manager 504 further has status transmitting module 502 for transmitting status information on the isochronous status channel. The status information may have to be encoded in some way before it can be transmitted.

Status information can be transmitted on the status channel periodically, or transmitted in portions. Updates to previously transmitted status information can be transmitted separately, or by transmitting the updated status information as a whole, i.e., the original information incorporating the update or updates. A combination is also possible if the fill status information is transmitted periodically, and updates received between periods are transmitted separately. The next period, the updated status information will be transmitted in full.

To read status information from the isochronous status channel, the television 102, the DVD player 103, the set-top box 104 and the personal computer 106 comprise respective status reading modules 511, 512, 513, 514 for reading status information from the status channel. This involves tapping into the status channel reading data from the status channel and decoding and processing this data to obtain the status information. The devices 102, 103, 104, 106 need to know the channel identifier of the status channel first. To learn this identifier, they could send an asynchronous message to the Status Manager and obtain a response with this identifier. Alternatively, they could simply scan all allocated channels to see if any status information can be found in any of them. The status channel can also have a predetermined reserved channel identifier, such as channel zero or channel sixty-three, which makes it very easy to tap into the status channel, and also assures that a status channel can always be allocated. However, this requires standardization of said channel identifier.

The DVD player 103 and the personal computer 106 further comprise status sending modules 515, 516 for sending status information to the Status Manager asynchronously. This way, the status information can be distributed by the Status Manager over the isochronous status channel. The Status Manager may then send back an acknowledgment message asynchronously. This message may contain the identifier of the status channel, so the DVD player 103 and the personal computer 106 know which channel they must tap into to obtain status information.

The status information can be available to the Status Manager directly. For example, if the Bus Manager is the Status Manager, it has direct access to the topology map, and can transmit this information at any time. The Isochronous Resource Manager has direct access to bandwidth- and channel-related information and can transmit this status information on the status channel whenever it changes, so all devices known when the available bandwidth has changed, when channels are allocated or deallocated, and so on. To transmit data over an isochronous channel, a device 101–106 must first reserve a channel and a certain amount of bandwidth at the Isochronous Resource Manager 105. Broadcasting the available bandwidth on the status channel has the advantage that devices can obtain the information from there and determine if there is sufficient bandwidth to satisfy its requirements. If so, it sends a request to the Isochronous Resource Manager 105 and gets allocated a channel. Ordinarily, a device must first send an asynchronous message to the Isochronous Resource Manager 105 to obtain the available bandwidth, and then send a second message to request a channel and a certain amount of bandwidth.

Other types of status information may come from other devices. Normally, a device 101–106 which needs to use some functionality in another device 101–106 must use asynchronous messages to find out if the other device 101–106 supports that functionality. This is called the Device Discovery Process. For example, if the camcorder 101 wants to use the television 104 to show a recorded movie, it must first query the television 104 to find out if this is possible. However, a device with status reading module 511–514 can simply read this information from the status channel.

If the devices 101–106 in the communication system 500 operate in accordance with the Home Audio/Video interoperability (HAVi) standard, then information on the capabilities of the devices can be obtained by querying a registry. This involves contacting the device for which information on its capabilities is necessary. However, in the communication system 500 this device can transmit the information in the registry over the status channel, so that devices with status reading module 511–514 can simply read it from the status channel. For communication systems using other interoperability standards with registries, the same technique can be used to save bandwidth. A device 101–106 may want to announce its capabilities or resources to other devices on the bus. It can provide this status information to the Status Manager, which can in turn transmit it on the status channel so the other devices can be informed about the device's capabilities. To this end, the Status Manager further has status reception module 503, with which it can receive status information from another device asynchronously. The status reception module 503 is coupled to the status transmitting module 502. After receiving the status information, and possibly some type of processing, updating or formatting, the status information is then passed on to the status channel. The Status Manager may, in response to receiving the status information, send back to the device an identifier for the status channel. This way, the device is automatically informed on which channel it should listen to obtain status information. If no status channel is presently allocated, the Status Manager could use the event of receiving status information from a device to determine that a status channel should be created. It then contacts the Isochronous Resource Manager to have an isochronous status channel allocated.

The status information can be information on a strength of a level of attachment between a mobile device 520, for example a handheld remote control unit or the handset of a wireless phone, and the personal computer 106, acting as a base station for the mobile device 520. The connection between the base station 106 and the mobile device 520 is typically wireless, for example using DECT technology, 802.11, HIPERLAN, or infrared communication. The level of attachment is for instance the strength of a signal from the mobile device 520 as received by the personal computer 106. The personal computer 106 then uses its status sending module 516 to send this status information to the Status Manager, which can then transmit it on the status channel so other devices can be informed.

There can be more than one base station in the network for one mobile device, for example a receiver for a wireless telephone can be located in every room. In that case, it can happen that another base station becomes more suited for controlling the mobile device 520. The base stations could as a first criterion measure the quality of their connection with the mobile device 520. If it turns out that another base station has a better quality connection than the base station currently controlling it, control should be transferred to that other base station. Alternatively, the currently controlling base station could measure its own connection and transfer control to another base station when the quality drops below a certain level.

Another criterion is the level for the availability of resources on the base stations. If the base station 106 is becoming too busy, it may transfer control over a mobile device 520 to another device to ensure the user gets a better performance when interacting with the mobile device 520. A procedure for transferring control over mobile devices from one base station to another is described in European patent application 00201212.8 (PHNL000193) by the same applicant as the present application.

The strength of the level of attachment of the mobile device 520 to the base station 106 can be transmitted over the status channel. The other base stations can tap into this status channel and learn the current strength. They can report their own signal strength on the status channel. Using this information, the base stations are able to negotiate between them which base station is best suited to transfer control over the mobile device 520 to.

The communication system 500 can also make use of multiple status channels, controlled by a single Status Manager or by separate Status Managers for different status channels. For example, one status channel could provide information on the available bandwidth on the bus, and another could be used by base stations to distribute information on mobile devices, as described above.

The invention claimed is:

1. A communication system comprising:
   a plurality of devices interconnected via a bus, the bus being capable of handling isochronous and asynchronous transmissions; and
   a status manager including:
      status channel creation means for creating on the bus a status channel for transmission access to the bus during an isochronous-channel sub-cycle, of an isochronous cycle, that precedes an asynchronous-channel sub-cycle of said isochronous cycle; and
      status transmitting means for transmitting status information on said status channel.

2. A communication system as claimed in claim 1, wherein a device among said plurality of devices includes status reading means for reading the transmitted status information from said status channel.

3. A communication system as claimed in claim 1, wherein a device among said plurality of devices includes status sending means for sending status information to the status manager asynchronously for subsequent said transmitting on said status channel.

4. A communication system as claimed in claim 1, wherein the status information comprises information on network topology of the communication system.

5. A communication system as claimed in claim 1, wherein the status information comprises information on capabilities of a device in the communication system.

6. A communication system as claimed in claim 1, wherein the status information comprises information on available bandwidth on the bus.

7. A communication system as claimed in claim 1, wherein the status information comprises information on signal strength between a mobile device and a base station device in the communication system.

8. The system of claim 1, wherein said isochronous-channel sub-cycle follows an isochronous-channel protocol, said asynchronous-channel sub-cycle follows an asynchronous-channel protocol, and said status channel creation means is configured for allocating, an isochronous channel subject to said isochronous-channel protocol said status channel.

9. The system of claim 1, wherein said isochronous-channel sub-cycle follows an isochronous-channel protocol, said asynchronous-channel sub-cycle follows an asynchronous-channel protocol, and said status channel creation means is configured for causing allocation, as an isochronous channel subject to said isochronous-channel protocol, said status channel.

10. A communication system comprising:
a plurality of devices interconnected via a bus, the bus being capable of handling isochronous and asynchronous transmissions; and
a status manager including,
status channel creation means for creating on the bus an isochronous status channel, and
status transmitting means for transmitting status information on the isochronous status channel, wherein the status manager further includes status reception means for asynchronously receiving status information from a device among said plurality of devices, coupled to the status transmitting means for transmitting the received status information on the isochronous status channel.

11. A communication system as claimed in claim 10, wherein the status manager is further arranged to send to the device an identifier for the isochronous status channel in response to receiving the status information.

12. In a communication system having a plurality of devices interconnected via a bus configured for handling isochronous and asynchronous transmissions, a device for use as status manager in the communication system, said device comprising:
status channel creation means for creating on the bus a status channel for transmission access to the bus during an isochronous-channel sub-cycle, of an isochronous cycle, that precedes an asynchronous-channel sub-cycle of said isochronous cycle; and
status transmitting means for transmitting status information on said status channel.

13. The system of claim 12, wherein said isochronous-channel sub-cycle follows an isochronous-channel protocol, said asynchronous-channel sub-cycle follows an asynchronous-channel protocol, and said status channel creation means is configured for allocating, as an isochronous channel subject to said isochronous-channel protocol, said status channel.

14. The system of claim 12, wherein said isochronous-channel sub-cycle follows an isochronous-channel protocol, said asynchronous-channel sub-cycle follows an asynchronous-channel protocol, and said status channel creation means is configured for causing allocation, as an isochronous channel subject to said isochronous-channel protocol, said status channel.

15. In a communication system having a plurality of devices interconnected via a bus configured for handling isochronous and asynchronous transmissions, and a status manager for creating on the bus a status channel for transmission access to the bus during an isochronous-channel sub-cycle, of an isochronous cycle, that precedes an asynchronous-channel sub-cycle of said isochronous cycle and for transmitting status information on said status channel, a device comprising a status reading module for reading the transmitted status information from said status channel.

16. The device of claim 15, wherein said isochronous-channel sub-cycle follows an isochronous-channel protocol, said asynchronous-channel sub-cycle follows an asynchronous-channel protocol, and said creating allocates, as an isochronous channel subject to said isochronous-channel protocol, said status channel.

17. The device of claim 15, wherein said isochronous-channel sub-cycle follows an isochronous-channel protocol, said asynchronous-channel sub-cycle follows an asynchronous-channel protocol, and said creating entails causing allocation, as an isochronous channel subject to said isochronous-channel protocol, said status channel.

18. In a communication system having a plurality of devices interconnected via a bus configured for handling isochronous and asynchronous transmissions, a device for use as status manager in the communication system, said device comprising:
status channel creation means for creating on the bus a status channel for transmission access to the bus during an isochronous-channel sub-cycle, of an isochronous cycle, that precedes an asynchronous-channel sub-cycle of said isochronous cycle; and
status transmitting means for transmitting status information on said status channel.

19. The device of claim 18, wherein said status information transmittable on said status channel is received by said device over said bus.

20. The device of claim 18, wherein said device obtains from a source said device accesses itself, without having to obtain from any other of the plural devices, said status information transmittable on said status channel.

21. The device of claim 18, wherein the status channel creation means comprises means for contacting a device, of the plural devices, that has means cooperative with said status channel creation means for establishing a channel.

22. The device of claim 18, further comprising means for asynchronously receiving the status information transmittable on said status channel.

* * * * *